W. M. SEXTON.
SKID.
APPLICATION FILED NOV. 17, 1913.
1,098,179.
Patented May 26, 1914.
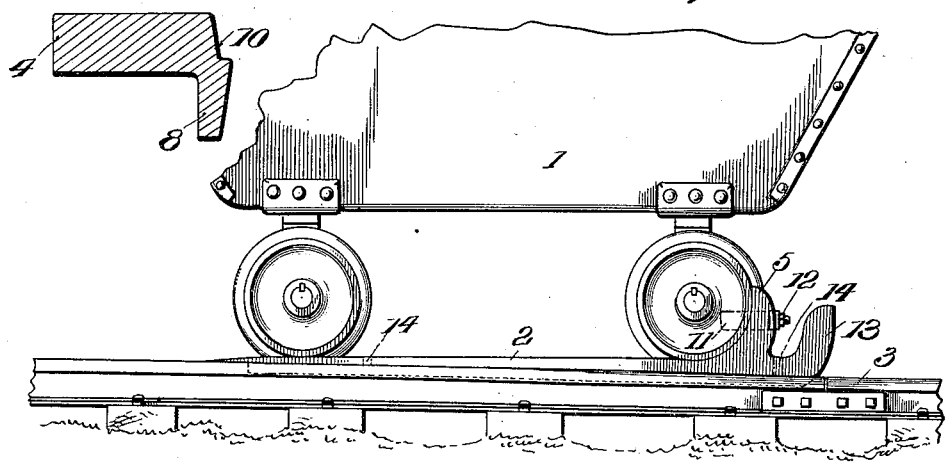
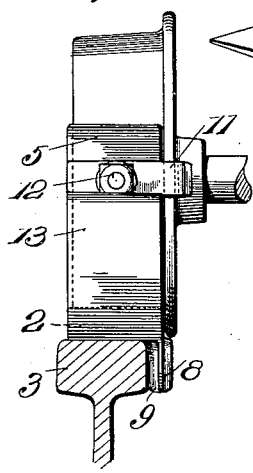
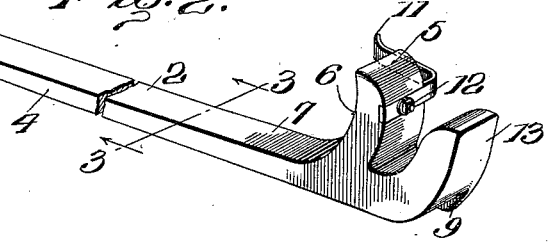
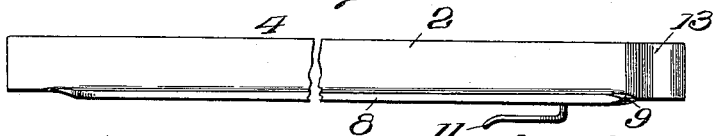
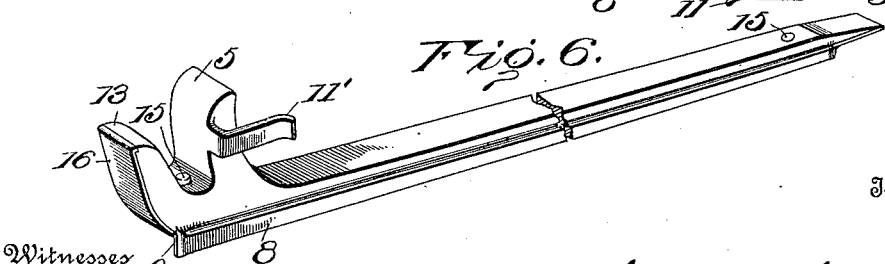

UNITED STATES PATENT OFFICE.

WHITSON M. SEXTON, OF KNOXVILLE, TENNESSEE.

SKID.

1,098,179.        Specification of Letters Patent.        Patented May 26, 1914.

Application filed November 17, 1913. Serial No. 801,436.

*To all whom it may concern:*

Be it known that I, WHITSON M. SEXTON, a citizen of the United States of America, and resident of Knoxville, Tennessee, have invented a new and useful Improvement in Skids, which invention is fully set forth in the following specification.

This invention relates to skids or rail-brakes for skidding railroad cars, and is especially intended for use with mining cars in long trains on steep grades, though its application is not restricted to this class of cars and it may be used on any cars.

The object of the invention is to provide skids adapted to be placed on the rails under the car wheels to support the entire weight of the car, and to act as runners on which one or more cars may be supported in a train while going down grade.

A further object is to provide a skid of this kind which requires no mechanical devices on the car for handling, but which may be placed by an operator under any one or more of the cars of a long train to distribute the braking action as experience indicates in handling such trains on grades, to avoid the dangerous slack often occurring between the rear cars and the motor or engine.

A further object is to adapt the construction of the skid to the functions which it performs, while securing simplicity in structure, durability and efficiency.

With the above objects in view, I provide a pair of skids or runners of iron, such as steel, cast or wrought, which are long enough to extend under the wheels on each side of the car or truck and support the entire weight of a car. Each skid on its lower edge is provided with a flat wearing surface integral with or separable from the skid, with a depending flange adapted to engage the inside of the rail. The upper surface is made on an incline which meets the bottom surface at the rear of the skid in a feather edge to permit the wheels to readily roll onto the skid. A stop is provided at the forward end having an upwardly curved surface to conform with the rim of the wheel, and on the stop is mounted a retaining or locking member for the rim of the wheel. This member may be integral with the stop or separable therefrom but secured thereon by securing means, such as a bolt or the like. A rabbet or recess is formed along one edge of the upper side of the skid to receive the flanges of the wheels and is in line with the locking member which coöperates with the wheels in holding the skid from upsetting sidewise. In order to oppose the thrust component acting on the stop to rotate the skid on its forward end or to tip up its rear end, the skid is prolonged forwardly beyond the stop. This prolongation also serves to distribute the load over the skid and produce an even wear. The above and other features of construction will be fully explained in the detailed description.

In order that the invention may be more readily understood, reference will be had to the accompanying drawings which are designed to assist the description and not to define the limits thereof.

In the drawings:—Figure 1 is a view in side elevation showing my improved skid in braking position; Fig. 2 is a perspective view of the same; Fig. 3 is a transverse sectional view taken on line 3—3 of Fig. 2; Fig. 4 is an end elevation of the skid when in braking position; Fig. 5 is a plan view looking from beneath, showing the bottom of the skid; and Fig. 6 is a perspective view showing the skid provided with a shoe and slightly modified flange-holding means.

Referring to the drawings, Fig. 1 shows diagrammatically a car 1, with its wheels supported on the skid 2 which is in position to slide on rails 3. A similar skid, not shown, is assumed to rest on the opposite rail of the track and support the car wheels on the opposite side of the car. The skid consists of a long body portion or runner 4, the bottom of which is flat and adapted to slide on the track rail, and is provided at its forward end with a stop member 5 having a curved face 6, the radius of curvature of which corresponds with that of the car wheel on which it is intended to be used. The end of the curved surface 6 gradually merges into the flat upper bearing surface 7 which makes a slight incline with the bottom of the runner, which latter tapers off to a thin edge at the rear to prevent slip when the car wheels run onto the skid. A flange 8 depends from the side of the skid and is adapted to bear against the inner side of the track rail. The inner forward end of this flange is somewhat beveled at 9 to facilitate the passage of the flange over irregularities such as those occurring at rail joints. On the same side of the skid as the flange and above it, is formed a recess 10 extending the length of the skid for reception of the flange of the car wheel, and on the stop member 5 is a locking member 11 secured to the stop by a bolt 12. This locking member 11 also receives the wheel flange and holds the skid from tipping off the track. Beyond the stop member 5 the runner is extended and terminates in an upturned portion or horn 13 which presents a curved face on its advancing side to overcome irregularities as noted above.

In order to renew the wearing surface on the bottom of the skid, holes 14, 14 are provided for receiving bolts 15, 15 to retain a shoe 16, as shown in Fig. 6. This shoe preferably extends around a part or the whole of the face of the horn 13 and runs beyond the end of the runner a short way. Instead of making the locking member 11 of a separable piece of metal, it may consist of a member 11′ formed integral with the stop 5.

The operation of the device as thus far described will be readily understood from what precedes. While only one skid has been described, it is obvious that the skids are designed to be used in pairs in skidding a car, and that the individual skids of a pair are made right and left-handed to adapt them to the right and left side of the track.

Assuming that a long train of mining cars is to go down grade, the operator selects one or more cars along the train for application of the skids. In front of the wheels of these cars, the skids are placed on the rails. As the cars advance, the wheels ride onto the skids, the front wheels rolling up against the stops with the forward portions of their flanges entering the locking member 11, at which time the rear wheels have rolled onto the rear end of the skid, thereby transferring the car from a rolling support to a sliding support. The draft of the draw-bar of the car is now converted into a thrust of the forward wheels against the stops 5 on the skid. This thrust tends to a rotation of the skid about a point below the point of application of this force, or in other words, to tip up the rear of the car. This tendency, however, is overcome by the prolongation of the runner beyond the stop member 5. This extension also permits a more extended and even distribution of the load on the skid and secures an even wear on the skid. It is also to be noted that the skids permit braking single cars on a long train without spragging or locking the wheels, which, when so locked, become flattened, causing the car to roll roughly on the rail and jolting the ore or coal off along the track. The skids also obviate the occurrence of dangerous slack in the train by retarding the acceleration of the rear cars, due to changes of grade along the track or to change of speed of the engine.

What is claimed is:

1. A skid for braking cars, said skid comprising a runner adapted to slide on the track rails and support the wheels of a car and having a depending side flange for engaging the track rail, a stop against which a car wheel may rest, and means on the stop adapted to engage the wheel flange for holding the skid in braking position.

2. A skid for braking cars, said skid comprising a runner adapted to slide on rails and support the wheels of a car and having a depending side flange for engaging the rails, a recess for receiving a car wheel flange, a stop against which the car wheel may rest, and means on the stop adapted to engage the wheel flange for holding the skid in braking position.

3. A skid for braking cars, said skid comprising a runner adapted to slide on rails and support the wheels of a car and having a side flange for engaging the track rails, a side recess for receiving the side flange of a car wheel, a stop against which a car wheel may rest, and means on the stop adapted to engage the wheel flange for holding the skid in braking position, the forward end of said runner extending beyond said stop.

4. A skid for braking cars, said skid comprising a runner adapted to slide on rails and support the wheels of a car and having a side flange for engaging the track rails, a side recess for receiving the side flange of a car wheel, a stop against which a car wheel may rest, means on the stop adapted to engage the wheel flange for holding the skid in braking position, the forward end of said runner extending beyond said stop and having a horn for guiding the skid over irregularities in the track.

5. A skid for braking cars, said skid comprising a runner adapted to slide on rails and extend under the wheels of a car to skid the car and having a side flange for engaging car track rails, and a stop on said runner against which a car wheel may rest, the forward end of said runner extending beyond said stop for distributing the load and preventing the skid from tipping up.

6. A skid for braking cars, said skid comprising a runner adapted to slide on rails and support the wheels of a car and having on its upper side a tread making a slight angle with the sliding surface of the runner, a side flange for engaging the side of the rails, a recess along one edge of the tread for receiving the flange of a wheel, a stop provided with flange retaining means, and a horn in advance of said stop.

7. A skid for braking cars, the same comprising a runner adapted to slide on rails and support the wheels of a car and having a side flange for engaging the rail, said flange at its forward inner end having a bevel for riding over side irregularities in the rails, and a stop located at a point intermediate the ends of the runner for the purpose described.

8. A skid for braking cars, the same comprising a runner adapted to slide on rails and extend under the wheels of a car to skid the car, the bottom of the runner having faces bearing on the tread of the rail and on one side of the rail, the top of the runner having faces against which the rim and flange of a car wheel bear, and means on the runner which clasp the wheel rim for holding the skid in braking position.

In testimony whereof I have signed this specification in the presence of two subscribing witnesses.

WHITSON M. SEXTON.

Witnesses:
 J. C. NEWMAN,
 B. E. McAMIS.

---

Copies of this patent may be obtained for five cents each, by addressing the "Commissioner of Patents, Washington, D. C."